United States Patent
Roisin et al.

(10) Patent No.: US 10,610,853 B2
(45) Date of Patent: Apr. 7, 2020

(54) METHOD FOR TREATMENT OF GAS

(71) Applicant: AXENS, Rueil Malmaison (FR)

(72) Inventors: Eric Roisin, Rueil Malmaison (FR); Nicolas Lambert, Chatou (FR); Yann Loonis, Paris (FR)

(73) Assignee: AXENS, Rueil Malmaison (FR)

( * ) Notice: Subject to any disclaimer, the term of this patent is extended or adjusted under 35 U.S.C. 154(b) by 0 days.

(21) Appl. No.: 15/572,199

(22) PCT Filed: Apr. 4, 2016

(86) PCT No.: PCT/EP2016/057350
§ 371 (c)(1),
(2) Date: Nov. 7, 2017

(87) PCT Pub. No.: WO2016/177520
PCT Pub. Date: Nov. 10, 2016

(65) Prior Publication Data
US 2018/0111114 A1    Apr. 26, 2018

(30) Foreign Application Priority Data
May 7, 2015 (FR) ...................................... 15 54114

(51) Int. Cl.
*B01J 23/888* (2006.01)
*B01J 23/755* (2006.01)
(Continued)

(52) U.S. Cl.
CPC ........ *B01J 23/888* (2013.01); *B01D 53/8603* (2013.01); *B01D 53/864* (2013.01);
(Continued)

(58) Field of Classification Search
None
See application file for complete search history.

(56) References Cited

U.S. PATENT DOCUMENTS

| 5,466,427 A | 11/1995 | Rumpf |
| 6,962,680 B1 | 11/2005 | Ishigaki |

(Continued)

FOREIGN PATENT DOCUMENTS

| EP | 1338557 A1 | 8/2003 |
| EP | 2644683 A1 | 10/2013 |

(Continued)

OTHER PUBLICATIONS

International Search Report PCT/EP2016/057350 dated Jun. 3, 2016.

*Primary Examiner* — Sheng H Davis
(74) *Attorney, Agent, or Firm* — Millen, White, Zelano and Branigan, P.C.

(57) ABSTRACT

A method for treatment of a gas having 10 to 0.5% by volume of at least one of COS and $CS_2$, and 30 ppm to 5% by volume of unsaturated hydrocarbons:
  a) hydrogenation of organic compounds unsaturated with respect to paraffins by contacting the gas with a hydrogenation catalyst in the presence of hydrogen at 100 to 400° C., to provide an effluent that is low in unsaturated hydrocarbon compounds, the hydrogenation catalyst having at least one metal that is palladium, platinum, nickel, or cobalt deposited on a porous substrate.
  b) catalytic hydrolysis-hydrogenation in the presence of water of COS and/or $CS_2$ present in the effluent of a) to provide an $H_2S$-rich effluent by bringing the effluent from a) into contact with a hydrolysis-hydrogenation catalyst.

20 Claims, 3 Drawing Sheets

(51) Int. Cl.
*B01J 23/75* (2006.01)
*B01J 23/42* (2006.01)
*B01D 53/86* (2006.01)
*B01J 23/883* (2006.01)
*B01J 23/44* (2006.01)
*B01J 23/882* (2006.01)
*C10K 1/34* (2006.01)
*B01J 21/04* (2006.01)
*B01J 35/00* (2006.01)

(52) U.S. Cl.
CPC .......... *B01D 53/8606* (2013.01); *B01J 21/04* (2013.01); *B01J 23/42* (2013.01); *B01J 23/44* (2013.01); *B01J 23/75* (2013.01); *B01J 23/755* (2013.01); *B01J 23/882* (2013.01); *B01J 23/883* (2013.01); *B01J 35/0006* (2013.01); *C10K 1/34* (2013.01); *B01D 2251/202* (2013.01); *B01D 2255/1023* (2013.01); *B01D 2255/2092* (2013.01); *B01D 2255/20746* (2013.01); *B01D 2255/20753* (2013.01); *B01D 2255/20769* (2013.01); *B01D 2255/20776* (2013.01); *B01D 2255/808* (2013.01); *B01D 2257/306* (2013.01); *B01D 2257/308* (2013.01); *B01D 2257/702* (2013.01)

(56) References Cited

U.S. PATENT DOCUMENTS

| | | | |
|---|---|---|---|
| 7,427,385 | B2 | 9/2008 | Scheirer |
| 8,147,787 | B2 | 4/2012 | Mak |
| 9,505,686 | B2 | 11/2016 | Daudin |
| 2013/0303811 | A1* | 11/2013 | Roisin ............... B01D 53/8603 585/251 |

FOREIGN PATENT DOCUMENTS

| | | |
|---|---|---|
| EP | 2662127 A1 | 11/2013 |
| WO | 2006065459 A1 | 6/2006 |
| WO | 2009020473 A1 | 2/2009 |
| WO | 2016177520 A1 | 11/2016 |

* cited by examiner

METHOD FOR TREATMENT OF GAS

FIELD OF THE INVENTION

The invention relates to a method for treatment of gas that comprises in particular sulfur-containing compounds as impurities to be eliminated. In particular, the method applies to the treatment of effluent gas obtained from furnaces of a unit for manufacturing carbon black.

STATE OF THE ART

There are various industrial methods that generate the emission of gas effluents that contain sulfur. These effluents or residual gases should be treated before their release into the atmosphere so as to bring the quantity of these polluting sulfur-containing compounds to acceptable levels, in such a way as to meet increasingly strict environmental standards.

The sulfur that is encountered in the industrial residual gases, for example in the gases obtained from units for gasification of carbon or petcoke or else biomass, or in the gases obtained from furnaces for calcination of the units for manufacturing carbon black, is generally in the form of sulfur anhydride, hydrogen sulfide, and carbon sulfide, such as carbon disulfide ($CS_2$) and carbonyl sulfide (COS). The carbon sulfides are relatively inert compounds, and they therefore remain difficult to eliminate from the effluent in an effective manner.

Various methods for eliminating sulfur are known in the state of the art. These methods are generally based on the principle of formation of hydrogen sulfide ($H_2S$), which is a compound that is reactive and easy to eliminate.

Thus, for example, the document U.S. Pat. No. 5,466,427 discloses a method for treatment of a residual gas that contains sulfur, in particular in the form of carbon sulfide, which consists in bringing said gas into contact with a catalyst so as to carry out a hydrolysis of the carbon disulfide ($CS_2$) and carbonyl sulfide (COS) into hydrogen sulfide. The catalyst that is described in this document comprises:

0.5-5% by weight of cobalt oxide and/or nickel oxide;
1.5-15% by weight of molybdenum trioxide;
70-98% by weight of titanium oxide.

As observed by the applicant, the method of the prior art operates correctly provided that the gas that is to be treated comprises a relatively small amount of unsaturated hydrocarbon products (in particular compounds such as alkyne and diene), i.e., at a maximum concentration of 50 ppm, and even 30 ppm by volume.

Also known is the document EP 2 662 127 of the applicant that discloses a method for treatment of a gas for converting the sulfur-containing compounds that are present in said gas, in particular in the form of CS2 and/or COS, which comprises the following steps:

a) A hydrogenation of the hydrocarbon compounds that are unsaturated with respect to paraffins, by bringing the gas into contact with a catalyst for hydrogenation in the presence of hydrogen at a temperature of between 100 and 400° C., in such a way as to provide an effluent that is low in unsaturated hydrocarbon compounds, b) A catalytic hydrolysis in the presence of water from the COS and/or CS2 that is present in the effluent that is obtained from step a) in such a way as to provide an $H_2S$-rich effluent by bringing the effluent that is obtained from step a) into contact with a hydrolysis catalyst, the hydrolysis catalyst comprising alumina or titanium oxide.

This document provides as an example a catalyst that comprises nickel (2.5% by weight of NiO), and molybdenum (9% by weight of $MoO_3$) deposited on a titanium oxide substrate ($TiO_2$).

One object of the invention is to propose a method for treatment of a gas that contains the sulfur-containing compounds that are present in said gas, in particular in the form of $CS_2$ and/or COS as an alternative, and which uses in particular a more effective hydrolysis-hydrogenation step.

DESCRIPTION

The invention therefore relates to a method for treatment of a gas that comprises from 10 ppm by volume to 0.5% by volume of at least one of the compounds COS and $CS_2$, and from 30 ppm by volume to 5% by volume of unsaturated hydrocarbon compounds, with said method comprising the following steps:

a) A hydrogenation of the hydrocarbon compounds that are unsaturated with respect to paraffins is carried out by bringing said gas into contact with a hydrogenation catalyst in the presence of hydrogen at a temperature of between 100 and 400° C., in such a way as to provide an effluent that is low in unsaturated hydrocarbon compounds, with the hydrogenation catalyst comprising at least one metal that is selected from among palladium, platinum, nickel, and cobalt deposited on a porous substrate, b) A catalytic hydrolysis-hydrogenation is carried out in the presence of water and hydrogen, of COS and/or $CS_2$ that is present in the effluent that is obtained from step a) in such a way as to provide an $H_2S$-rich effluent by bringing into contact the effluent that is obtained from step a), with a hydrolysis-hydrogenation catalyst, with the hydrolysis-hydrogenation catalyst comprising a substrate that consists essentially of alumina, at least one metal of group VIII selected from among nickel and cobalt, at least one metal of group VIB selected from among molybdenum and tungsten, and in which the metal content of group VIII, expressed in terms of oxide, is between 1% and 10% by weight in relation to the total catalyst weight, in which the metal content of group VIB, expressed in terms of oxide, is between 3% and 20% by weight in relation to the total catalyst weight and in which the (metal of group VIII)/(metal of group VIB) molar ratio is between 0.4 and 2 (mol/mol).

It was thus observed that step a) for hydrogenation of the feedstock makes it possible to prevent the gradual deactivation, and even a capping of the hydrolysis-hydrogenation catalyst of step b), following in particular the formation of polymerization gums at the surface of the catalysts. Actually, owing to the pretreatment of the feedstock in step a), the hydrocarbon compounds that are unsaturated are transformed by hydrogenation into compounds that are not able to polymerize and therefore to produce a poisoning, a coking or a capping of the pores of the hydrolysis-hydrogenation catalyst during the subsequent step b), hence an improved effectiveness of the method for treatment in relation to the prior art.

Within the context of the invention, the term "unsaturated hydrocarbon compounds" groups in particular the compounds such as alkenes, alkynes, and polyunsaturated compounds of the diene type.

In addition, surprisingly enough, it was noted that the use of a catalyst of step b) that meets the characteristics mentioned above improves the hydrolyse-hydrogenation yield of the sulfur-containing compounds that are still present in the effluent generated in step a).

Preferably, the hydrogenation catalyst comprises a content of platinum, expressed in terms of metal, of between 0.2% by weight and 4% by weight in relation to the catalyst weight. Alternatively, the hydrogenation catalyst comprises a content of palladium, expressed in terms of metal, of between 0.05% by weight and 5% by weight in relation to the catalyst weight.

In an alternative embodiment, the hydrogenation catalyst comprises a content of nickel, expressed in terms of oxide, of between 0.5% by weight and 15% by weight in relation to the catalyst weight.

In the case where the hydrogenation catalyst comprises cobalt, preferably the content of cobalt, expressed in terms of oxide, is between 0.5% by weight and 15% by weight in relation to the catalyst weight.

If the hydrogenation catalyst also comprises molybdenum, the content of molybdenum, expressed in terms of oxide, is between 1% and 20% by weight in relation to the catalyst weight.

Preferably, the hydrolysis-hydrogenation catalyst has a metal content of group VIII, expressed in terms of oxide, of between 1% and 8% by weight in relation to the total catalyst weight. In a more preferred manner, the metal content of group VIII, expressed in terms of oxide, is between 3% and 7% by weight in relation to the total catalyst weight.

Preferably, the hydrolysis-hydrogenation catalyst has a metal content of group VIB, expressed in terms of oxide, between 5% and 18% by weight in relation to the total catalyst weight. In a more preferred manner, the metal content of group VIB is between 6% and 15% by weight in relation to the total catalyst weight.

In an advantageous way, the hydrolysis-hydrogenation catalyst comprises cobalt and molybdenum.

Within the framework of the invention, the substrate of the hydrolysis-hydrogenation catalyst consists essentially of alumina, i.e., the $Al_2O_3$ content is at least 98% by weight in relation to the total weight of the substrate.

Preferably, the (metal of group VIII)/(metal of group VIB) molar ratio is between 0.4 and 1.5 (mol/mol).

According to an embodiment, steps a) and b) are carried out in the same reactor in which two catalyst beds are placed successively, namely a hydrogenation catalyst and a hydrolysis-hydrogenation catalyst. The beds are arranged in relation to one another in the reactor in such a way that the feedstock that is to be treated encounters the hydrogenation catalyst bed before the hydrolysis-hydrogenation catalyst bed.

In accordance with another alternative embodiment, the method uses two specific reactors (i.e., a hydrogenation reactor and a hydrolysis-hydrogenation reactor) and in which the hydrogenation reactor is installed downstream from the hydrolysis-hydrogenation reactor.

According to a preferred embodiment, steps a) and b) are implemented with catalysts of identical formulation comprising a substrate that essentially consists of alumina, at least one metal of group VIII selected from among nickel and cobalt, at least one metal of group VIB selected from among molybdenum and tungsten, preferably a catalyst based on nickel or cobalt. In a more preferred manner, the catalysts are based on cobalt and molybdenum.

According to a preferred embodiment, step a) is carried out at a pressure of between 0.1 and 5 MPa and a VVH of between 1,000 and 4,000 $h^{-1}$.

According to a preferred embodiment, step b) is carried out at a pressure of between 0.1 and 5 MPa and a VVH of between 1,000 and 4,000 $h^{-1}$.

According to a preferred embodiment, the method according to the invention comprises a step for treatment of the gas obtained from the hydrolysis-hydrogenation step that consists in, for example, trapping the formed $H_2S$ or in converting $H_2S$ into elementary sulfur.

According to an advantageous embodiment, it is possible to initiate a step for liquid/gas separation from the gas that is to be treated before carrying out the hydrogenation step.

Likewise, it is possible to carry out a liquid/gas separation from the gas that is obtained from step b) before sending it to a unit for treatment of $H_2S$.

The Gaseous Feedstock that is to be Treated

The gas that can be treated by the method according to the invention can be obtained from units for gasification of carbon or petcoke or else biomass or furnaces for calcination of the units for manufacturing carbon black. Typically, the gas that is to be treated can comprise COS and/or $CS_2$ at a content of between 10 ppm by volume and 0.5% by volume. The gas thus comprises COS at a content that is most often between 10 ppm by volume and 0.3% by volume, $CS_2$ at a content of between 10 ppm by volume and 0.3% by volume, and optionally HCN at a content of between 20 ppm by volume and 0.2% by volume. The gas can also comprise hydrogen, CO, $SO_2$, $CO_2$, $H_2S$, and water.

The gas generally comprises unsaturated hydrocarbons with a content of between 30 ppm by volume and 5% by volume, preferably between 0.05 and 3% by volume. Generally, the unsaturated hydrocarbon compounds essentially comprise short-chain hydrocarbon products, typically C2, C3 or C4, of the family of alkenes, alkynes, and polyunsaturated compounds, such as, for example, ethylene, acetylene, butadiene.

The Hydrogenation Step (Step a):

Within the framework of the invention, the hydrogenation can be selective, i.e., it can involve only the alkynes and the polyunsaturated compounds of the diene type, but not monoolefins. However, even if this is generally not necessary, there is no drawback in using a total hydrogenation, i.e., in hydrogenating all of the unsaturated compounds, including monoolefins into paraffins.

The hydrogenation catalyst used in step a) comprises a metal that is selected from among platinum, palladium, nickel and cobalt by themselves or in a mixture and deposited on a porous substrate.

According to a first variant of the method according to the invention, the hydrogenation catalyst comprises platinum, and the platinum content, expressed in terms of metal, is typically between 0.02% by weight and 4% by weight in relation to the total catalyst weight. Preferably, the platinum content is between 0.05% and 3% by weight, in a more preferred manner between 0.1% and 2.5% by weight in relation to the total catalyst weight.

According to a second variant of the method according to the invention, the hydrogenation catalyst comprises palladium, and the palladium content, expressed in terms of metal, is between 0.05% by weight and 5% by weight in relation to the total catalyst weight. Preferably, the palladium content is between 0.05 and 3% by weight, and in a more preferred manner between 0.1% by weight and 1% by weight in relation to the total catalyst weight.

According to a third variant of the method according to the invention, the hydrogenation catalyst comprises nickel, and the nickel content is generally between 0.5% by weight and 15% by weight of nickel oxide in relation to the total catalyst weight. Preferably, the nickel oxide content is between 4% and 12% by weight, in a more preferred manner between 6% and 10% by weight in relation to the total catalyst weight.

According to a fourth variant of the method according to the invention, the hydrogenation catalyst comprises cobalt, and the cobalt content is generally between 0.5% by weight and 15% by weight of cobalt oxide in relation to the total catalyst weight. Preferably, the cobalt oxide content is between 1% and 10% by weight, in a more preferred manner between 2% and 4% by weight in relation to the total catalyst weight.

According to a particular embodiment, the hydrogenation catalyst contains either platinum or palladium or nickel or cobalt and can also comprise molybdenum. In this case, the content, expressed in terms of molybdenum oxide of said catalyst, is between 1% by weight and 20% by weight in relation to the total catalyst weight, preferably between 6% and 18% by weight, and in a more preferred manner between 8% and 15% by weight.

The catalyst of step a) is a catalyst that also comprises a porous substrate on which are deposited the metal or metals or precursors of metals or oxides that are hydrogenation-active. The substrate can be selected from among aluminas, silicas, titanium oxide, silicon carbide, or mixtures thereof.

The porous substrate is preferably selected from among alumina, nickel aluminate or cobalt aluminate, silica, silica-aluminas, silicon carbide, titanium oxide, or mixtures thereof. Pure alumina or titanium oxide is used in a preferred manner.

According to a very preferred variant, the substrate essentially consists of cubic gamma-alumina or delta-alumina.

In a more preferred way, the hydrogenation catalyst that is used in step a) comprises palladium. According to another more preferred mode, it comprises nickel and molybdenum. Alternatively, the hydrogenation catalyst comprises cobalt and molybdenum.

The catalyst according to the invention can be prepared by means of any technique that is known to one skilled in the art, and in particular by impregnation of metal elements on the selected substrate. This impregnation can be carried out, for example, according to the mode that is known to one skilled in the art by the name of dry impregnation, in which the exact quantity of elements desired in the form of soluble salts is introduced into the selected solvent, for example demineralized water, in such a way as to fill as exactly as possible the porosity of the substrate. The substrate thus filled by the solution is preferably dried. The preferred substrate is alumina or titanium oxide that can be prepared from any type of precursors and tools for shaping known to one skilled in the art.

After the introduction of the precursors of metal elements and optionally a shaping of the catalyst, the former undergoes a heat treatment that comprises a drying step followed by a calcination. The drying is generally performed in air between 20° C. and 200° C., preferably between 40° C. and 180° C. The calcination is generally implemented in air or in dilute oxygen, and the treatment temperature is generally between 200° C. and 550° C., preferably between 300° C. and 500° C.

The hydrogenation step a) is carried out in the presence of hydrogen under the following operating conditions:
At a pressure of between 0.1 and 5 MPa, preferably between 0.5 and 3 MPa;
At a temperature of between 100 and 400° C., preferably between 150° C. and 250° C.;
With an hourly volumetric flow rate (VVH) of between 1,000 and 4,000 $h^{-1}$.

Furthermore, the quantity of hydrogen added in step a) is such that the molar ratio between hydrogen and the unsaturated hydrocarbon compounds that are to be hydrogenated is greater than the stoichiometry and preferably between 1.1 and 3,000 mol per mol and preferably between 300 and 2,000 mol per mol.

The Hydrolysis-Hydrogenation Step (Step b):

The hydrolysis-hydrogenation catalyst used in step b) is a catalyst that comprises a substrate that consists essentially of alumina (i.e., the $Al_2O_3$ content is at least 98% by weight in relation to the total weight of the substrate) and at least one metal of group VIII that is selected from among nickel and cobalt and at least one metal of group VIB that is selected from among molybdenum and tungsten.

Furthermore, the metal content of group VIII, expressed in terms of oxide, is between 1% and 10% by weight in relation to the total catalyst weight. The metal content of group VIB, expressed in terms of oxide, is between 3% and 20% by weight in relation to the total catalyst weight. Finally, the (metal of group VIII)/(metal of group VIB) molar ratio is between 0.4 and 2 (mol/mol). Preferably, the hydrolysis-hydrogenation catalyst has a metal content of group VIII, expressed in terms of oxide, of between 1% and 8% by weight in relation to the total catalyst weight. In a more preferred manner, the metal content of group VIII, expressed in terms of oxide, is between 3% and 7% by weight in relation to the total catalyst weight. Preferably, the hydrolysis-hydrogenation catalyst has a metal content of group VIB, expressed in terms of oxide, between 5% and 18% by weight in relation to the total catalyst weight. In a more preferred manner, the metal content of group VIB is between 6% and 15% by weight in relation to the total catalyst weight.

In an advantageous way, the hydrolysis-hydrogenation catalyst comprises cobalt and molybdenum.

Preferably, the (metal of group VIII)/(metal of group VIB) molar ratio is between 0.4 and 1.5 (mol/mol).

Preferably, the alumina of the substrate is a cubic gamma-alumina or a delta-alumina.

The catalyst can be prepared by means of any technique that is known to one skilled in the art, and in particular by impregnation of precursors of nickel, cobalt, molybdenum, on the substrate that was previously shaped.

This impregnation can be carried out, for example, according to the mode that is known to one skilled in the art by the name of "dry impregnation," in which the exact quantity of elements desired in the form of soluble salts is introduced into the selected solvent, for example demineralized water, in such a way as to fill as exactly as possible the porosity of the substrate.

The impregnated substrate can then be dried, preferably at a temperature of between 20° C. and 200° C., in a more preferred manner between 40° C. and 180° C. A calcination is then generally implemented in air or in dilute oxygen, and the calcination temperature is generally between 200° C. and 550° C., preferably between 300° C. and 500° C.

In one embodiment, the hydrolysis-hydrogenation catalyst is prepared by implementing a single impregnation to deposit each of the metals of groups VIII and VIB. In an advantageous manner, the catalyst is prepared by employing a single step of co-impregnation of the metals of group VIII and group VIB.

The hydrolysis-hydrogenation step is typically carried out at a pressure of between 0.1 and 5 MPa, preferably between 0.5 and 3 MPa, at a temperature of between 100 and 400° C., preferably between 150° C. and 250° C., and a volume of catalyst in relation to the quantity of gas that is to be treated of 1 m³ of catalyst per 1,000 to 4,000 Nm³/h of gas that is to be treated, or a VVH of between 1,000 and 4,000 h⁻¹.

The procedure is performed in the presence of excess water in relation to the molecules to be hydrolyzed-hydrogenated. Preferably, the procedure is performed with a water/hydrolyzable product molar ratio of between 5 and 1,000 mol per mol and in a more preferred manner between 10 and 500 mol per mol. As far as the hydrogen is concerned, the catalyst that is used is generally active in the reaction for conversion to water of carbon monoxide, which makes it possible to generate hydrogen according to the reaction:

$$CO+H_2O \rightarrow CO_2+H_2$$

BRIEF DESCRIPTION OF THE FIGURES

These aspects as well as other aspects of the invention will be clarified in the detailed description of particular embodiments of the invention, with reference being made to the figures, in which.

The figures are not drawn to scale. Generally, similar elements are denoted by identical references in the figures.

Figure 1:
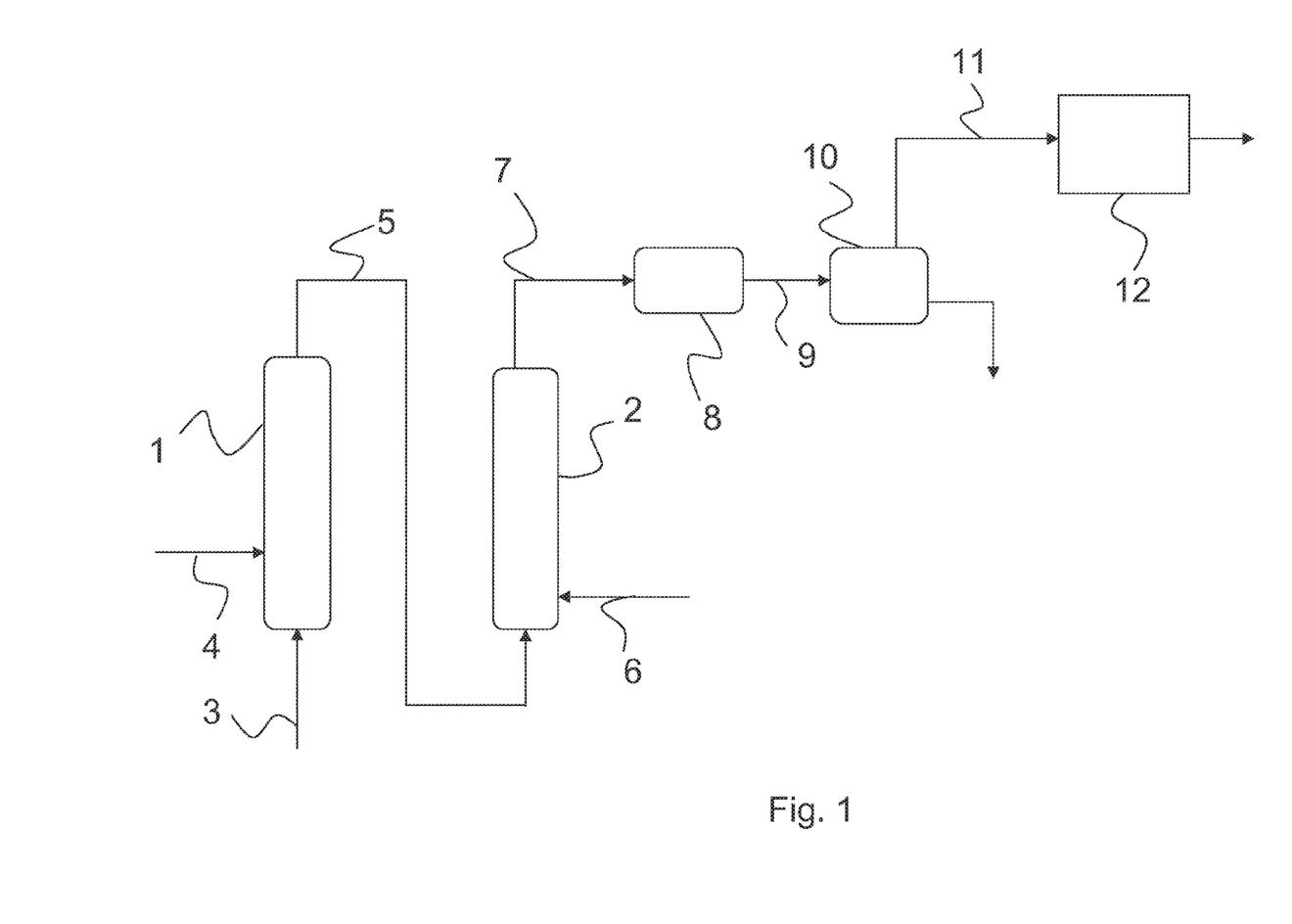
FIG. 1 shows a first embodiment of the method according to the invention.

With reference to FIG. 1, the method uses a first reactor 1 in which a catalyst for hydrogenation of unsaturated compounds is present, preferably a catalyst for selective hydrogenation. Any hydrogenation catalyst described above can be used in this embodiment.

As shown in FIG. 1, the gaseous feedstock that is to be treated is introduced into the reactor 1 via the line 3 while an additional quantity of hydrogen, in addition to the hydrogen initially present in the gas that is to be treated, can optionally be provided in the reactor 1 using the line 4.

The total quantity of hydrogen present in the gas to be treated and optionally added is such that the molar ratio between the hydrogen and the unsaturated hydrocarbon compounds to be hydrogenated is greater than the stoichiometry and preferably between 1.1 and 3,000 mol per mol, and preferably between 300 and 2,000 mol per mol.

The hydrogenation step is conducted generally at a pressure of between 0.1 and 5 MPa, preferably between 0.5 and 3 MPa, at a temperature of between 100 and 400° C., preferably between 150° C. and 250° C., and a volume of catalyst in relation to the quantity of gas that is to be treated with 1 m³ of catalyst per 1,000 to 4,000 Nm³/h of gas that is to be treated, or a VVH of between 1,000 and 4,000 h⁻¹.

With reference to FIG. 1, the effluent that is obtained from the hydrogenation reactor is then sent into the hydrolysis-hydrogenation reactor 2, via the line 5, in which is carried out the conversion of the sulfide compounds COS and CS₂ into H₂S on a specific catalyst in the presence of water and hydrogen.

If the content of water or hydrogen of the feedstock is not sufficient, water or additional hydrogen can be introduced via the line 6 so as to carry out the hydrolysis-hydrogenation with excess water in relation to the hydrolyzable molecules (COS, CS₂, HCN).

Any hydrolysis-hydrogenation catalyst described above can be used in this embodiment.

The reactions employed during this step can be represented by the following reactions:

$$COS+H_2O \rightarrow CO_2+H_2S$$

$$CS_2+2H_2O \rightarrow 2H_2S+CO_2$$

$$COS+4H_2 \rightarrow CH_4+H_2O+H_2S$$

$$CS_2+2H_2 \rightarrow CH_4+2H_2S$$

The hydrolysis-hydrogenation step is typically carried out at a pressure of between 0.1 and 5 MPa, preferably between 0.5 and 3 MPa, at a temperature of between 100 and 400° C., preferably between 150° C. and 250° C., and a volume of catalyst in relation to the quantity of gas that is to be treated of 1 m³ of catalyst for 1,000 to 4,000 Nm³/h of gas that is to be treated, or a VVH of between 1,000 and 4,000 h⁻¹.

The procedure is performed in the presence of excess water in relation to the hydrolysis-hydrogenable molecules. Preferably, the procedure is performed with a water/hydrolyzable product molar ratio of between 5 and 1,000 mol per mol, and in a more preferred manner of between 10 and 500 mol per mol.

The gaseous effluent that is treated in the hydrolysis-hydrogenation reactor 2 is then extracted and routed via the line 7 to a heat exchanger 8, for example a cooling tower, in such a way as to cool the treated gas. The treated and cooled gas is transferred via the line 9 into a liquid/gas separator 10. The liquid water for condensation is recovered at the bottom of the separator 10, while the gas that is low in H₂O and that contains H₂S is brought—thanks to the line 11—to a treatment unit 12 that can be, for example, an H₂S trapping unit or an H₂S conversion unit, which carries out, for example, the oxidation of H₂S to form elementary sulfur:

$$2H_2S+SO_2 \rightarrow 3S+2H_2O$$

Figure 2:
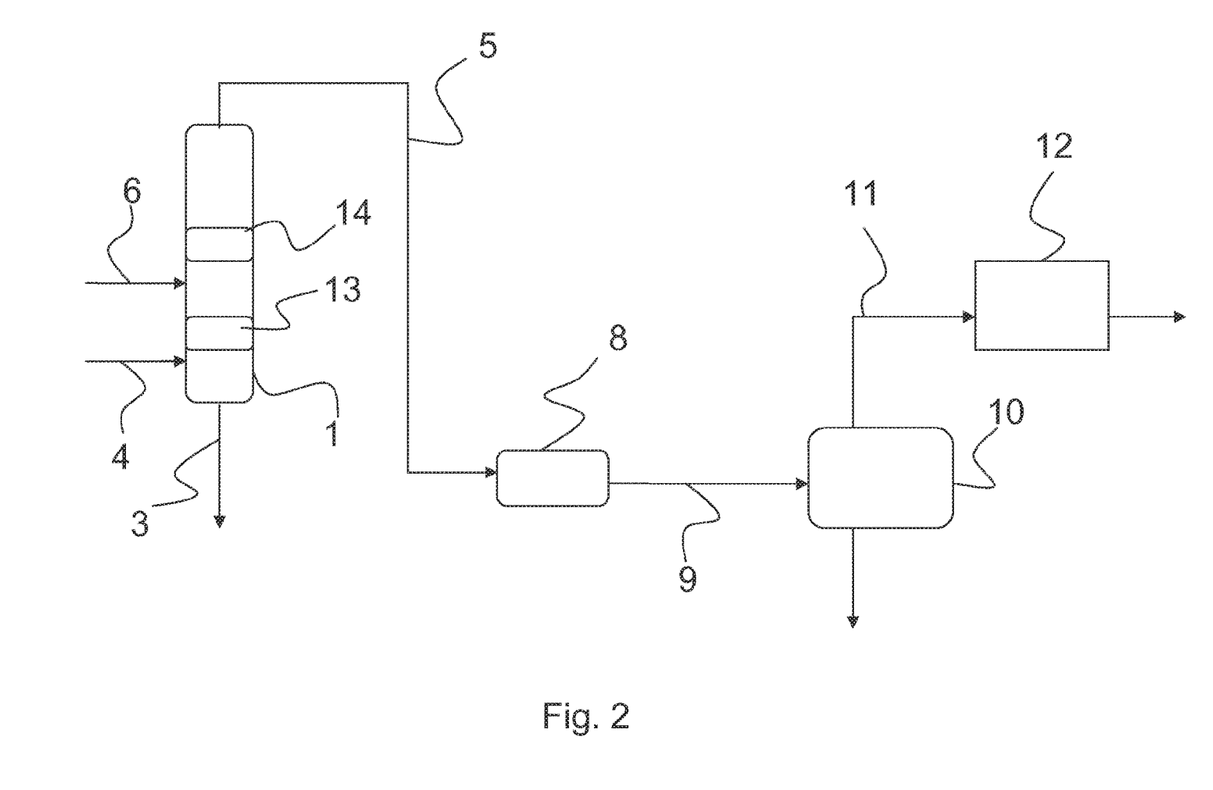
FIG. 2 shows a second embodiment of the method according to the invention.

According to the invention, the two hydrogenation and hydrolysis-hydrogenation reactions of the feedstock that is to be treated can be carried out in the same reactor comprising a first hydrogenation catalyst bed and a second hydrolysis-hydrogenation catalyst bed, with the beds being arranged in relation to one another in the reactor in such a way that the gaseous feedstock that is to be treated encounters the hydrogenation catalyst bed before the hydrolysis-hydrogenation catalyst bed, as shown in FIG. 2.

With reference to FIG. 2, the second embodiment employs a single reactor 1 in which the hydrogenation and hydrolysis-hydrogenation catalytic reactions are carried out. For this purpose, the reactor comprises two catalyst beds 13 and 14 respectively for hydrogenation and hydrolysis-hydrogenation. These two beds can be separated from one another by an inner space or in contrast can be consecutive without any intermediate space. The catalyst beds 13 and 14 are arranged in the reactor 1 in such a way that the feedstock that is to be treated first encounters the hydrogenation catalytic bed 13 and then the hydrolysis-hydrogenation catalytic bed.

So as to carry out the hydrogenation of the gaseous feedstock that is introduced via the line 3, an additional supply of hydrogen can optionally be carried out by means of the line 4 that is located upstream from the catalyst bed 13. When this is necessary, an inner space separates the catalytic beds 13 and 14 so as to position in this space an injection point of an addition of water that is necessary to the hydrolysis-hydrogenation reaction via the line 6.

The operating conditions that are used for the two catalytic reactions and described with reference to FIG. 1 can be applied in this second embodiment. Any hydrogenation catalyst or hydrolysis-hydrogenation catalyst described above can also be used in this embodiment.

In a particular embodiment, for steps a) and b), the method according to the invention uses catalysts that have identical formulations that are arranged in two different reactors (according to FIG. 1) or in one and the same reactor (according to FIG. 2).

In a similar way to the embodiment of FIG. 1, the gaseous effluent—after the hydrolysis-hydrogenation catalytic step—is evacuated from the reactor 1 and sent via the line 5 into a heat exchanger 8, and then into a separator tank 10 via the line 9. Condensation water is extracted from the separator tank 10 at the bottom, and a gas charged with $H_2S$ that is transferred to a unit for trapping or for conversion of $H_2S$ 12 is extracted from the tank separator 10 at the top.

Figure 3:
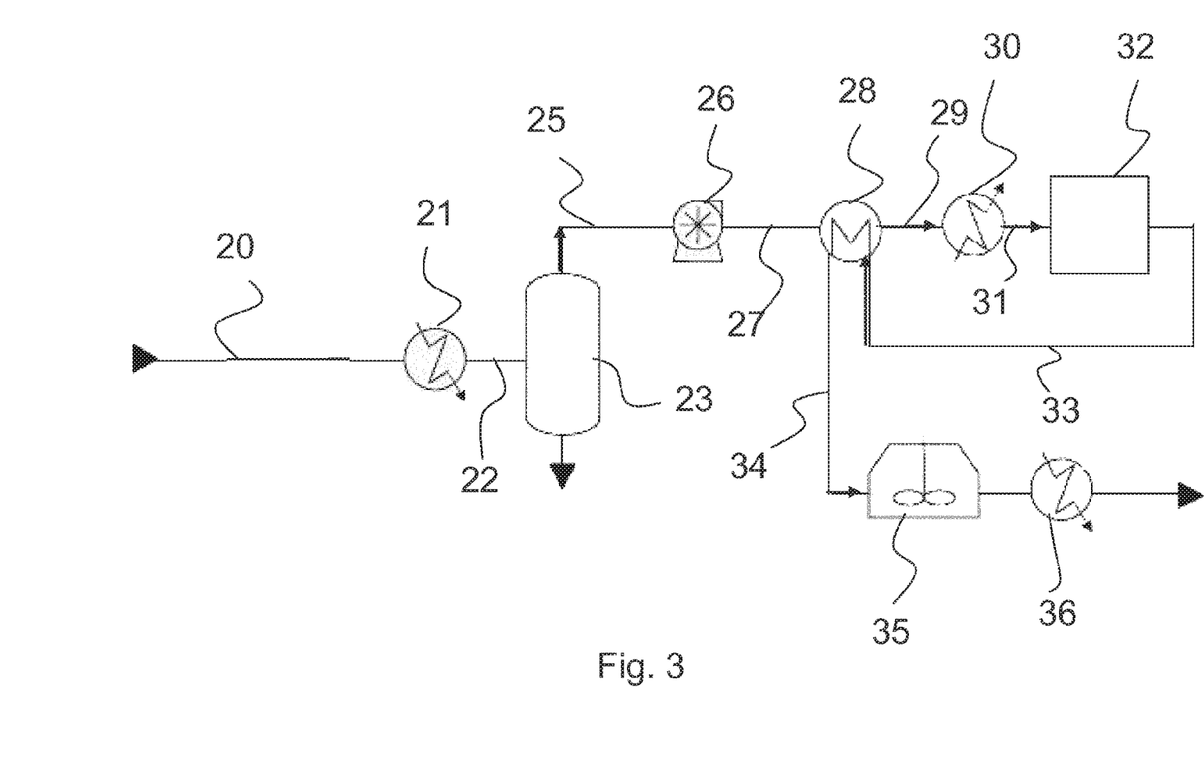
FIG. 3 shows a third embodiment of the method according to the invention.

The third embodiment of the method according to the invention is shown in FIG. 3 and essentially differs from the embodiments of FIGS. 1 and 2 in that it comprises a preliminary step for gas/liquid separation carried out on the gas that is to be treated. It is actually advantageous essentially to remove excess water and/or optionally liquid organic compounds that may or may not be dissolved in the gaseous phase so as to reduce the volume of feedstock that is to be treated, while preserving excess water to carry out the hydrolysis-hydrogenation reaction.

In this case, as shown in FIG. 3, the gas that is to be treated that is generally hot is sent to a heat exchanger 21 via the line 20 where it is cooled, and then sent via the line 22 to a separator tank 23. In the tank 23, two phases, namely a gas phase at the top and a liquid phase at the bottom that contains the water of the feedstock, are separated. The gas that is separated from this liquid and optionally a portion of the dissolved water that is obtained from the separator tank 23 is sent via the pipe 25 into a compressor 26 to be compressed there.

The compressed gas optionally undergoes, as shown in FIG. 3, a step of heating through the optional heat exchanger 28, which, when it is present, is fed by a hot fluid. This hot fluid is—preferably and according to the example of FIG. 3—the hot gaseous effluent that is obtained from the reaction zone 32 for hydrogenation and hydrolysis-hydrogenation. The previously-heated compressed gas can optionally be brought to the operational temperature by means of an optional heating unit 30, for example an exchanger, before being introduced into the reaction zone 32 where the hydrogenation and hydrolysis-hydrogenation reactions are carried out according to the method of the invention. The hot effluent that is obtained from the reaction zone 32 is evacuated via the line 33 and is introduced into the heat exchanger 28 to reheat the gas that is to be treated. After having been cooled with contact of the gas that is to be treated, the treated gas that is rich in $H_2S$ can optionally be sent via the line 34 into a second optional condenser 35, for example a cooling tower, and/or optionally into a heat exchanger 36 that is also optional. This cooling makes it possible to regulate the temperature of the flow to a temperature that is compatible with possible treatments downstream. Thus, the cooled flow can then be treated in particular in a unit (not shown) for trapping $H_2S$ or for conversion of $H_2S$ into elementary sulfur.

EXAMPLES

The examples presented below have been obtained from a gaseous feedstock A that corresponds to an effluent that is obtained from a unit for production of carbon black and comprises sulfur-containing and nitrogen-containing compounds (COS, $CS_2$, and HCN), and acetylene.

TABLE 1

Composition of the Feedstock A

| Composition of the Feedstock A | Content (% by Volume) |
|---|---|
| $CS_2$ | 0.08 |
| HCN | 0.05 |
| COS | 0.013 |
| $SO_2$ | 0.007 |
| $H_2S$ | 0.15 |
| $CH_4$ | 0.3 |
| $C_2H_2$ | 0.3 |
| CO | 8 |
| $H_2$ | 9 |
| $CO_2$ | 2 |
| $H_2O$ | 45 |
| $O_2$ | 0.1 |
| $N_2$ | 35 |

The gaseous feedstock that is to be treated therefore contains a non-negligible quantity of acetylene at a level of 0.3% by volume.

Example 1 (for Comparison)

The feedstock A that is described in Table 1 is first sent into a first reactor according to step a) of the invention. The hydrogenation catalyst that is used during step a) consists of 0.28% by weight of Pd on a substrate that consists of agglomerated gamma-alumina in the form of balls with a 1.7 mm diameter. Step a) is implemented under the following operating conditions:

Temperature (° C.): 220
Pressure (MPa): 0.2
VVH ($h^{-1}$): 3,200
Content of $H_2$ in the feedstock: 9% by volume; additional hydrogen therefore is not added.

The composition of the effluent that is obtained from step a) is analyzed, by gas phase chromatography, after 48 hours of operation. The composition of the effluent that is obtained from step a) is provided in Table 2.

TABLE 2

Composition of the Effluent from the Hydrogenation Step

| Effluent Obtained from Step a) | Content (% by Volume) |
|---|---|
| $CS_2$ | 0.07 |
| HCN | 0.005 |
| COS | 0.008 |
| $SO_2$ | 0.001 |
| $H_2S$ | 0.18 |
| $CH_4$ | 0.3 |
| $C_2H_2$ | <0.01 |
| $C_2H_6$ | 0.3 |
| CO | 7.8 |
| $H_2$ | 9 |
| $CO_2$ | 2.1 |
| $H_2O$ | 45 |
| $O_2$ | <0.001 |
| $N_2$ | 35 |

The preliminary treatment of the gas from the feedstock by hydrogenation thus makes it possible to transform acetylene into ethane and consequently to bring the acetylene content to a value of less than 0.01% by volume.

The effluent that is obtained from step a) is then directed treated in a second reactor (step b) of the invention). The catalyst that is used during step b) has the following composition (expressed relative to the total catalyst weight): 2.5% by weight of nickel oxide (NiO), 9.0% by weight of molybdenum trioxide ($MoO_3$), and 88.5% by weight of titanium oxide.

The operating conditions of this step b) are as follows:

Temperature (° C.): 220

Pressure (MPa): 0.2

VVH ($h^{-1}$): 2,000

The water content in the effluent is 45% by volume; additional water is therefore not added to carry out step b).

The composition of the effluent that is obtained from step b) is analyzed by gas phase chromatography. The results are presented in Table 3.

TABLE 3

Composition of the Effluent of the Hydrolysis-Hydrogenation Step

| Effluent Obtained from Step b) | Content (% by Volume) |
|---|---|
| $CS_2$ | 0.01 |
| HCN | <0.001 |
| COS | 0.005 |
| $SO_2$ | 0.001 |
| $H_2S$ | 0.30 |
| $CH_4$ | 0.3 |
| $C_2H_2$ | <0.01 |
| $C_2H_6$ | 0.3 |
| CO | 4.6 |
| $H_2$ | 12.2 |
| $CO_2$ | 5.3 |
| $H_2O$ | 42 |
| $O_2$ | <0.001 |
| $N_2$ | 35 |

The analyses indicate that the preliminary hydrogenation step for the purpose of saturating the unsaturated organic compounds makes it possible to preserve the catalytic performances of the catalyst, in particular the activity by hydrolysis-hydrogenation relative to carbon disulfides.

A lowering of the $CS_2$ content on the order of 87% is achieved.

Example 2 (According to the Invention)

The same feedstock A whose composition was provided in Table 1 is treated in a hydrogenation step under the same conditions as Example 1.

The effluent that is obtained from step a) after 48 hours of operation is then treated in a second reactor (step b) of the invention). The catalyst that is used during step b) consists of 3% by weight of cobalt oxide, 14% by weight of molybdenum oxide, with a gamma-alumina substrate. The hydrolysis-hydrogenation catalyst that is used therefore has a molar ratio (Co/Mo) that is equal to 0.4.

Step b) is implemented under the following operating conditions:

Temperature (° C.): 220

Pressure (MPa): 0.2

VVH (h−1): 2,000

The content of $H_2O$ in the effluent that is obtained from step a) (see Table 2) is 45% by volume; it is not necessary to add water to the effluent before treating it according to step b).

The composition of the effluent that is obtained from step b) is provided in Table 4.

TABLE 4

Composition of the Effluent from the Hydrolysis-Hydrogenation Step

| Effluent Obtained from Step b) | Content (% by Volume) |
|---|---|
| $CS_2$ | 0.006 |
| HCN | <0.001 |
| COS | 0.005 |
| $SO_2$ | <0.001 |
| $H_2S$ | 0.46 |
| $CH_4$ | 0.31 |
| $C_2H_2$ | <0.01 |
| $C_2H_6$ | 0.30 |
| CO | 1.20 |
| $H_2$ | 15.7 |
| $CO_2$ | 9.0 |
| $H_2O$ | 38.0 |
| $O_2$ | <0.001 |
| $N_2$ | 35.0 |

It is observed that the hydrogenation step (step a)) carried out on the gas has a positive effect on the conversion yield, and the use of a hydrolysis-hydrogenation catalyst that meets the characteristics of the invention makes it possible to improve the conversion of $CS_2$. Thus, a lowering of the $CS_2$ content on the order of 92% is achieved.

Example 3 (for Comparison)

The same gaseous feedstock A whose composition was provided in Table 1 is first sent into a first reactor for hydrogenation of the unsaturated compounds according to step a) of the invention, under the same conditions as those of Example 1.

The effluent that is obtained from step a) is then directed toward a second reactor (step b) of the invention). The catalyst that is used during step b) consists of 0.65% by weight of cobalt oxide, 14% by weight of molybdenum oxide, with a gamma-alumina substrate. The hydrolysis-hydrogenation catalyst that is used therefore has a molar ratio (Co/Mo) that is equal to 0.09.

Step b) is implemented under the following operating conditions:

Temperature (° C.): 220

Pressure (MPa): 0.2

VVH ($h^{-1}$): 2,000

The content of $H_2O$ in the effluent that is obtained from step a) (see Table 2) is 45% by volume; it is not necessary to add water in the effluent before treating it according to step b).

The composition of the effluent that is obtained from step b) is provided in Table 5.

TABLE 5

Composition of the Effluent from the Hydrolysis-Hydrogenation Step

| Effluent Obtained from Step b) | Content (% by Volume) |
|---|---|
| $CS_2$ | 0.025 |
| HCN | 0.005 |
| COS | 0.009 |
| $SO_2$ | 0.020 |
| $H_2S$ | 0.46 |
| $CH_4$ | 0.35 |
| $C_2H_2$ | <0.01 |
| $C_2H_6$ | 0.30 |
| CO | 3.10 |
| $H_2$ | 13.60 |
| $CO_2$ | 6.90 |

TABLE 5-continued

Composition of the Effluent from
the Hydrolysis-Hydrogenation Step

| Effluent Obtained from Step b) | Content (% by Volume) |
|---|---|
| $H_2O$ | 40.2 |
| $O_2$ | <0.001 |
| $N_2$ | 35.0 |

A lowering of the $CS_2$ content, which is only on the order of 69%, is achieved.

Example 4 (According to the Invention)

The same feedstock A whose composition was provided in Table 1 is first sent into a first reactor for hydrogenation of the unsaturated compounds according to step a) of the invention, under the same conditions as those of Example 1.

The effluent that is obtained from step a) is then directed to a second reactor (step b) of the invention). The catalyst that is used during step b) consists of 3.9% by weight of nickel oxide, 28% by weight of tungsten oxide, with a gamma-alumina substrate. The hydrolysis-hydrogenation catalyst that is used therefore has a molar ratio (Ni/W) that is equal to 0.43.

Step b) is implemented under the following operating conditions:

Temperature (° C.): 220
Pressure (MPa): 0.2
VVH ($h^{-1}$): 2,000

The content of $H_2O$ in the effluent that is obtained from step a) (see Table 2) is 45% by volume; it is not necessary to add water in the effluent before treating it according to step b).

The composition of the effluent that is obtained from step b) is provided in Table 6.

TABLE 6

Composition of the Effluent from
the Hydrolysis-Hydrogenation Step

| Effluent Obtained from Step b) | Content (% by Volume) |
|---|---|
| $CS_2$ | 0.008 |
| HCN | 0.004 |
| COS | 0.006 |
| $SO_2$ | 0.01 |
| $H_2S$ | 0.45 |
| $CH_4$ | 0.35 |
| $C_2H_2$ | <0.01 |
| $C_2H_6$ | 0.30 |
| CO | 3.25 |
| $H_2$ | 13.60 |
| $CO_2$ | 6.80 |
| $H_2O$ | 40.2 |
| $O_2$ | <0.001 |
| $N_2$ | 35.0 |

A lowering of the $CS_2$ content on the order of 90% is achieved.

Example 5 (According to the Invention)

The feedstock A whose composition is provided in Table 1 is first sent into a first reactor for hydrogenation of unsaturated compounds according to step a) of the invention. Step a) is implemented under the operating conditions and with the catalyst of step a) of Example 1.

The effluent that is obtained from step a) is then directed to a second reactor (step b) of the invention). The catalyst that is used during step b) consists of 2.5% by weight of nickel oxide, 9.0% by weight of molybdenum oxide, with a gamma-alumina substrate. The hydrolysis-hydrogenation catalyst that is used therefore has a molar ratio (Ni/Mo) equal to 0.53.

Step b) is implemented under the following operating conditions:

Temperature (° C.): 220
Pressure (MPa): 0.2
VVH ($h^{-1}$): 2,100

The content of $H_2O$ in the effluent that is obtained from step a) (see Table 2) is 45% by volume; it is not necessary to add water to the effluent before treating it according to step b). The composition of the effluent that is obtained from step b) is provided in Table 7.

TABLE 7

Composition of the Effluent from
the Hydrolysis-Hydrogenation Step

| Effluent Obtained from Step b) | Content (% by Volume) |
|---|---|
| $CS_2$ | 0.007 |
| HCN | <0.001 |
| COS | 0.007 |
| $SO_2$ | <0.001 |
| $H_2S$ | 0.46 |
| $CH_4$ | 0.3 |
| $C_2H_2$ | <0.01 |
| $C_2H_6$ | 0.3 |
| CO | 0.89 |
| $H_2$ | 15.3 |
| $CO_2$ | 8.6 |
| $H_2O$ | 36 |
| $O_2$ | <0.001 |
| $N_2$ | 35 |

A lowering of the $CS_2$ content on the order of 91% is achieved.

Example 6 (for Comparison)

The feedstock A whose composition is provided in Table 1 is first sent into a first reactor for hydrogenation of the unsaturated compounds according to step a) of the invention. Step a) is implemented under the operating conditions and with the catalyst of step a) of Example 1.

The effluent that is obtained from step a) is then directed toward a second reactor according to step b) of the invention. The catalyst that is used during step b) consists of 17% by weight of cobalt oxide, 14% by weight of molybdenum oxide, with a gamma-alumina substrate. During the preparation of this catalyst, the total quantity of cobalt and molybdenum was impregnated in a single impregnation step on the substrate. The hydrolysis-hydrogenation catalyst that was used has a molar ratio (Co/Mo) that is equal to 2.3.

Step b) is implemented under the following operating conditions:

Temperature (° C.): 220
Pressure (MPa): 0.2
VVH ($h^{-1}$): 2,100

The content of $H_2O$ in the effluent that is obtained from step a) (see Table 2) is 45% by volume; it is not necessary to add water in the effluent before treating it according to step b).

The composition of the effluent that is obtained from step b) is provided in Table 8.

TABLE 8

Composition of the Effluent from the Hydrolysis-Hydrogenation Step

| Effluent Obtained from Step b) | Content (% by Volume) |
|---|---|
| $CS_2$ | 0.03 |
| HCN | 0.004 |
| COS | 0.010 |
| $SO_2$ | 0.01 |
| $H_2S$ | 0.46 |
| $CH_4$ | 0.3 |
| $C_2H_2$ | <0.01 |
| $C_2H_6$ | 0.3 |
| CO | 0.89 |
| $H_2$ | 15.3 |
| $CO_2$ | 8.6 |
| $H_2O$ | 36 |
| $O_2$ | <0.001 |
| $N_2$ | 35 |

The results of Examples 2, 4, and 5 show that the catalysts according to the invention based on the formulation NiMo/$Al_2O_3$, NiW/$Al_2O_3$ or CoMo/$Al_2O_3$ with metal contents according to the invention and metal of group VIII/metal of group VIB molar ratios of between 0.2 and 4 mol/mol lead to effluents having $CS_2$ and COS contents that are less than or equal to 0.008. Moreover, the use of the catalysts of comparison examples 3 and 6 lead to effluents having $CS_2$ and COS contents respectively of 0.025 to 0.03 and 0.009 to 0.010.

Furthermore, it is noted that the $CS_2$ contents of the effluents obtained at the end of the treatment with the catalysts according to the invention are also smaller than in the case of Example 1 (for comparison) that uses an NiMo/$TiO_2$ catalyst.

The invention claimed is:

1. A method of reducing sulfur in a gas, comprising treatment of a gas that comprises from 10 ppm by volume to 0.5% by volume of at least one of the compounds COS and $CS_2$, and from 30 ppm by volume to 5% by volume of unsaturated hydrocarbon compounds:
   a) hydrogenation (1) of hydrocarbon compounds that are unsaturated with respect to paraffins by contacting said gas with a hydrogenation catalyst in the presence of hydrogen at a temperature of between 100 and 400° C., in such a way as to provide an effluent that is low in unsaturated hydrocarbon compounds, with the hydrogenation catalyst comprising at least one metal that is palladium, platinum, nickel, or cobalt deposited on a porous substrate,
   b) catalytic hydrolysis-hydrogenation (2) in the presence of water from COS and/or $CS_2$ that is present in the effluent that is obtained from a) in such a way as to provide an $H_2S$-rich effluent, by contacting the effluent obtained from a), with a hydrolysis-hydrogenation catalyst, and with the addition of hydrogen, the hydrolysis-hydrogenation catalyst comprising at least one metal of group VIII that is nickel or cobalt, at least one metal of group VIB that is molybdenum or tungsten, and a substrate that consists essentially of alumina and in which the metal content of group VIII, expressed in terms of oxide, is between 1% and 10% by weight in relation to the total catalyst weight, in which the metal content of group VIB, expressed in terms of oxide, is between 3% and 20% by weight in relation to the total catalyst weight and in which the (metal of group VIII)/(metal of group VIB) molar ratio is between 0.4 and 2 (mol/mol) whereby hydrolysis—hydrogenation of the effluent from a) occurs.

2. The method according to claim 1, in which the hydrogenation catalyst has a platinum content, expressed in terms of metal, of between 0.2% by weight and 4% by weight in relation to the catalyst weight.

3. The method according to claim 1, in which the hydrogenation catalyst has a palladium content, expressed in terms of metal, of between 0.05% by weight and 5% by weight in relation to the catalyst weight.

4. The method according to claim 1, in which the hydrogenation catalyst has a nickel content, expressed in terms of oxide, of between 0.5% by weight and 15% by weight in relation to the catalyst weight.

5. The method according to claim 1, in which the hydrogenation catalyst has a cobalt content, expressed in terms of oxide, of between 0.5% by weight and 15% by weight in relation to the catalyst weight.

6. The method according to claim 1, in which the hydrogenation catalyst further comprises molybdenum at a content that is expressed in terms of oxide of between 1% and 20% by weight in relation to the catalyst weight.

7. The method according to claim 1, in which the hydrolysis-hydrogenation catalyst has a content of metal of group VIII, expressed in terms of oxide, of between 1% and 8% by weight in relation to the total catalyst weight.

8. The method according to claim 1, in which the hydrolysis-hydrogenation catalyst has a content of metal of group VIB, expressed in terms of oxide, of between 5% and 18% by weight in relation to the total catalyst weight.

9. The method according to claim 1, in which the hydrolysis-hydrogenation catalyst comprises cobalt and molybdenum.

10. The method according to claim 1, in which a) and b) are carried out in the same reactor that comprises a hydrogenation catalyst bed (13) and a hydrolysis-hydrogenation catalyst bed (14), with the beds (13, 14) being arranged in relation to one another in the reactor in such a way that the gas that is to be treated encounters the hydrogenation catalyst bed (13) before the hydrolysis-hydrogenation catalyst bed (14).

11. The method according to claim 1, in which a) and b) are implemented with catalysts of identical formulation, a substrate that consists essentially of alumina, at least one metal of group VIII that is nickel or cobalt, and at least one metal of group VIB that is molybdenum or tungsten.

12. The method according to claim 1, in which a) is carried out at a pressure of between 0.1 and 5 MPa and a VVH of between 1,000 and 4,000 $h^{-1}$.

13. The method according to claim 1, in which b) is carried out at a pressure of between 0.1 and 5 MPa and a VVH of between 1,000 and 4,000 $h^{-1}$.

14. The method according to claim 1, comprising c) treating $H_2S$-rich effluent obtained from b) in a unit trapping $H_2S$ or converting $H_2S$ into elementary sulfur.

15. The method according to claim 1, in which a liquid/gas separation of the gas that is to be treated is carried out before carrying out hydrogenation a).

16. The method according to claim 1, in which the gas that is to be treated is obtained from units for gasification of carbon or petcoke or biomass or calcination furnaces of units manufacturing carbon black.

17. The method according to claim 1, in which the hydrolysis-hydrogenation catalyst has a content of metal of group VIII, expressed in terms of oxide, of between 3% and 7% by weight in relation to the total catalyst weight.

18. The method according to claim 1, in which the hydrolysis-hydrogenation catalyst has a content of metal of group VIB, expressed in terms of oxide, of between 6% and 15% by weight in relation to the total catalyst weight.

19. The method according to claim 1, wherein the hydrolysis-hydrogenation catalyst substrate consists essentially of gamma alumina.

20. The method according to claim 1, wherein effluent from b) has a content of $CS_2$ and COS of 0.008% or less by volume.

* * * * *